Nov. 19, 1968 J. E. MARTIN 3,411,420
VIBRATORY EARTH ROLLER

Filed June 8, 1967 2 Sheets-Sheet 1

INVENTOR
JOHN E. MARTIN

BY
ATTORNEYS

Nov. 19, 1968  J. E. MARTIN  3,411,420
VIBRATORY EARTH ROLLER

Filed June 8, 1967  2 Sheets-Sheet 2

INVENTOR
JOHN E. MARTIN

BY Burns, Doane, Benedict, Swecker & Mathis
ATTORNEYS.

though widely used, may however prove unsatisfactory under certain circumstances. For example, particular problems are likely to be encountered in situations where the vibratory displacement of the roller relative to the chassis induced by the vibrator shaft, causes corresponding variations in the center-to-center distance between the motor and vibrator shafts. Such periodic variation in the distance between the motor and vibrator shafts may frequently cause the endless belts connecting the shafts to become inverted or misaligned within the usual sheave channels or to move off the sheaves, thereby impairing operation of the earth roller. In addition such relative shaft motion may cause various flexible deformations of the belts which, continuing over a sustained period, may reduce effective belt life.

United States Patent Office 3,411,420
Patented Nov. 19, 1968

3,411,420
VIBRATORY EARTH ROLLER
John E. Martin, San Antonio, Tex., assignor to Tampo Manufacturing Company, San Antonio, Tex., a corporation of Texas
Filed June 8, 1967, Ser. No. 644,674
8 Claims. (Cl. 94—50)

ABSTRACT OF THE DISCLOSURE

A vibratory earth roller includes a chassis having a roller mounted for rotation relative to the chassis by resilient suspension means permitting limited relative translational movement and angular deflection between the chassis and the axis of rotation of the roller. Vibrator means within the roller includes a vibrator shaft mounted concentrically within the roller for independent rotary motion relative thereto. Motor means resiliently mounted on the chassis drives an output shaft rotatably mounted on the chassis in fixed spaced relation thereto. A driven shaft is rotationally mounted on the chassis in fixed spaced relation from the output shaft. Driving and driven sheaves, respectively connected with the output and driven shafts, are drivingly connected by endless flexible belt means. The vibrator shaft is drivingly connected to the driven shaft by an axially elongatable, intermediate shaft having universal joint connections to both the driving and driven shafts to isolate vibrational displacements of the roller from the endless belt means.

Background of the invention

Figure 1:
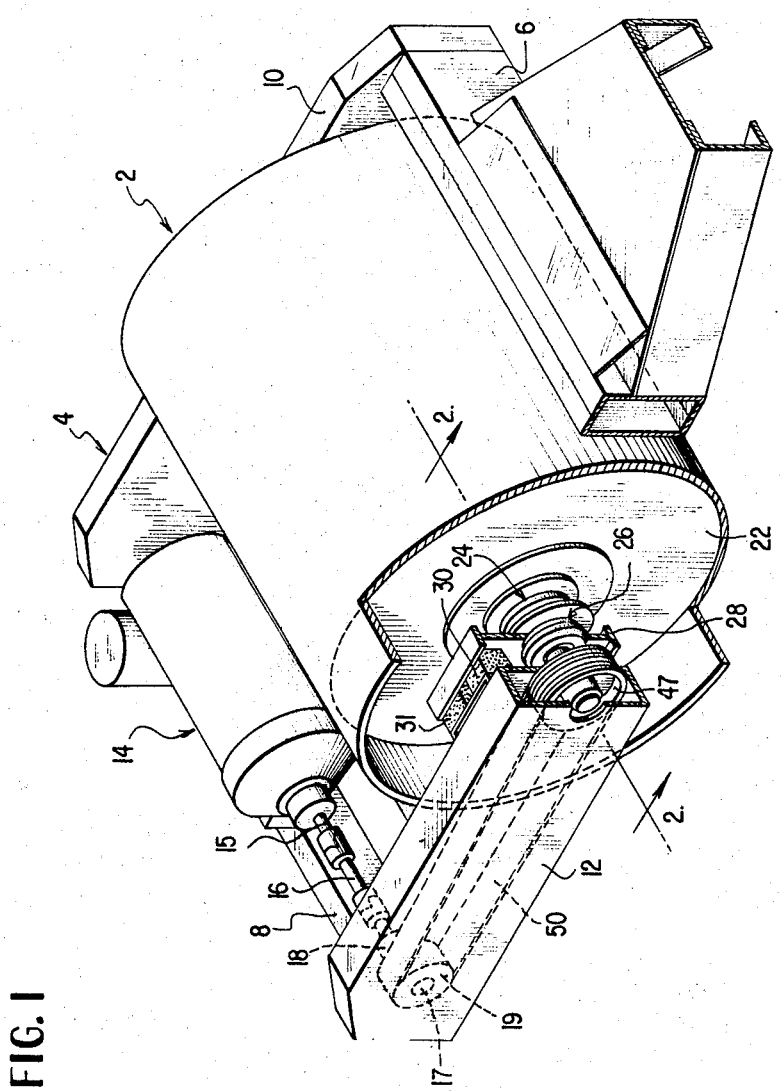

This invention relates to a vibratory earth roller.

In compacting earth surfaces and the like it is frequently advantageous to utilize a so-called vibratory earth roller. Such rollers generally include a chassis having a roller mounted for rotation relative to the chassis by resilient suspension means permitting limited movement between the chassis and the roller. A vibrator shaft having eccentrically weighted portions, rotatably mounted concentrically within the roller, may be independently rotated relative to the roller to set up intense vibratory forces which enhance earth compaction. Such independent motion is frequently achieved by mounting a motor on the chassis and connecting an output shaft of the motor with the vibrator shaft by use of endless flexible belt means drivingly connected between suitable sheaves secured to the two shafts.

Vibratory earth rollers of the type described,A similar problem may occur during steering motion of the earth roller which is frequently effected by applying a turning force to the chassis. During such turning, inertia forces and terrain engagement acting on the roller may be such as to cause the roller to skew relative to the chassis thus deforming the resilient suspension in such a manner as to provide an additional angular variation as well as center-to-center distance variation between the shafts, with adverse results similar to those previously described.

Summary of invention

It is therefore a general object of the invention to provide a vibratory earth roller designed to obviate problems of the type previously described.

It is a particular object of the invention to provide a vibratory earth roller of the type described wherein vibratory and steering displacements of the roller relative to the chassis are isolated from the endless belt drive.

It is a further object of the invention to provide a vibratory earth roller of the type described in which the possibility that induced vibratory or steering displacement of the roller may cause the flexible belts to become detached from or otherwise misaligned with the sheaves, is effectively minimized.

It is yet another object of the invention to provide a vibratory earth roller of the type described so constructed as to minimize periodic flexural deformations of the endless belt drives which might otherwise reduce effective belt life.

In its broadest aspects the invention resides in an improvement to a vibratory earth roller of the type including a chassis and a roller mounted for rotation relative to the chassis by resilient suspension means. The suspension means permits limited relative movements in three dimensions and in relative angular relationship between the chassis and the axis of rotation of the roller. The roller further includes vibrator means having a vibrator shaft concentric with the roller mounted therein for independent rotary motion. Motor means mounted on the chassis includes an output shaft. Driving and driven sheaves respectively connected with the output and vibrator shafts are drivingly connected by endless belt means.

The improvement comprises a rotatable driven shaft mounted on the chassis in fixed spaced relation from the output shaft. The driven shaft is fixedly connected with the driven sheave and is drivingly connected connected to the vibrator shaft by flexible drive means. In this manner vibratory and steering displacements of the roller relative to the chassis are isolated from the flexible belt means, thus minimizing disadvantages of the type previously described.

The drawings

Figure 2:
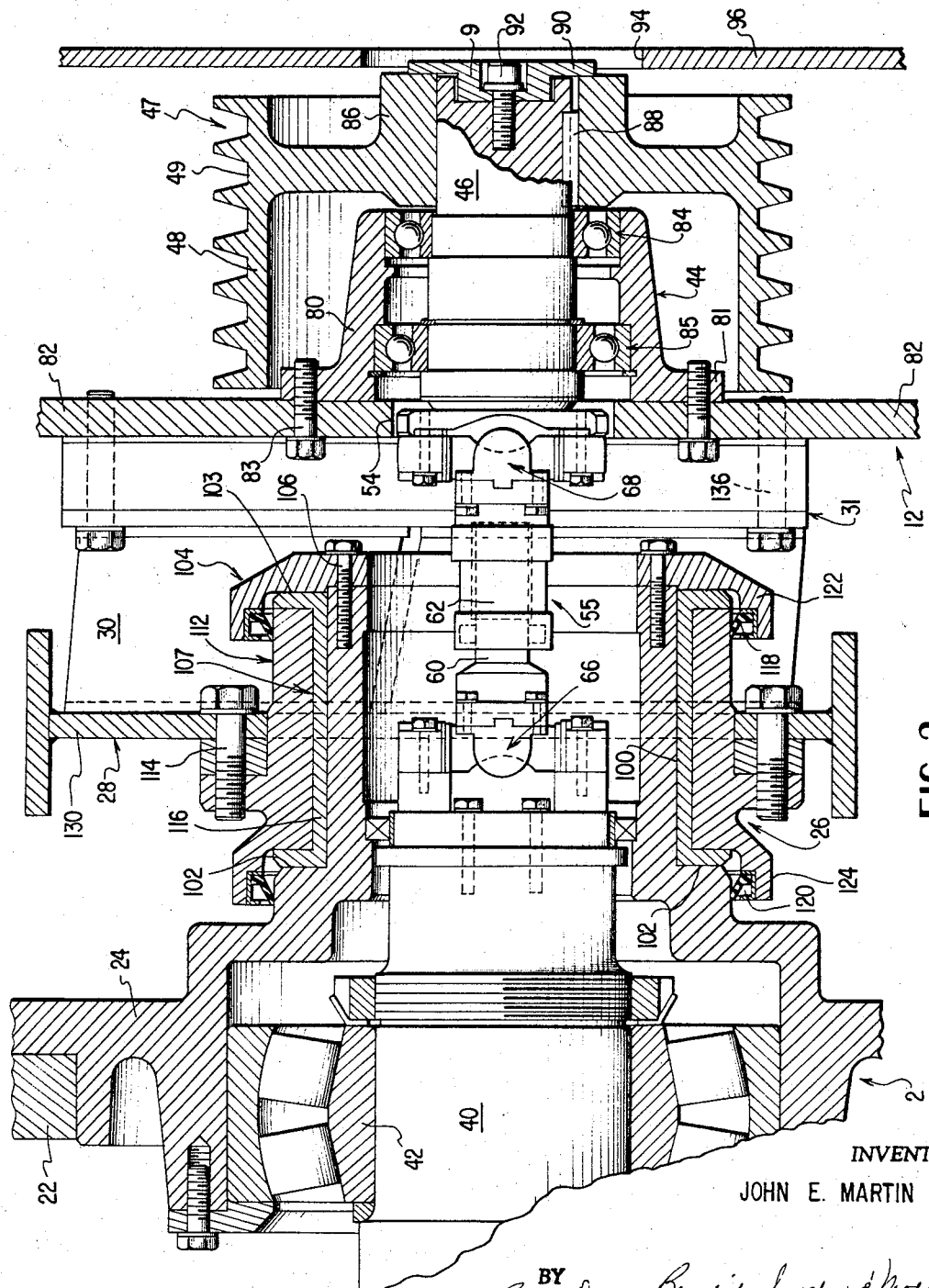

One preferred embodiment of the invention intended to accomplish the foregoing objects is illustrated in the accompanying drawings in which:

FIGURE 1 is a perspective front view partially in cross-section of a vibratory earth roller according to the present invention; and FIGURE 2 is a cross-sectional end view of a portion of the vibratory earth roller shown in FIGURE 1 taken along the lines 2—2 therein.

Detailed description

Referring to FIGURE 1 of the drawings, the preferred embodiment of the invention there shown includes a hollow cylindrical roller 2 mounted for rotation about a horizontal axis in a chassis 4. The chassis 4 has front and rear ends 6 and 8 respectively and includes longitudinally extending, right and left, hollow box section, side girders 10 and 12 respectively. Secured to the chassis 4 is a motor 14 supported on resilient mountings (not shown). A rotary drive shaft 15 of the motor 14 is connected by a universal joint 16 to an output shaft 17 extending into the interior of the right box girder 12 and mounted for rotation about a horizontal axis in fixed spaced relation to the chassis by conventional bearings 18. The free extremity of the output shaft 17 is provided with a driving sheave 19 enclosed within the interior of the right box girder 12. Removable access panels, not shown, may be provided for the outer wall of girder 12. The forward end of the roller carries latch means, not shown, for connection with a draft vehicle.

The roller 2 adjacent its axial extremities is provided with two axially recessed, radially extending, end plates 22, each spaced laterally inwardly from the adjacent one of the side girders 10 and 12. Fixedly secured to each of the end plates 22 concentric with the axis of rotation of the roller 2 and extending laterally outward towards the adjacent side girder, is a hollow hub designated generally as 24. Each hub 24 is supported for rotation about a horizontal axis by a bearing 26 (to be described in more detail hereinafter) provided in a vertically extending supporting beam 28 spaced laterally from and parallel to the adjacent side girder. The upper and lower extremities of the supporting beam 28 are secured to adjacent portions of the adjacent side girder by resilient suspension members 30 secured to rigid spacing panels 31 fixedly connected to the side girder. The elastomeric members 30 permit limited relative motion in both vertical, horizontal, and longitudinal directions between the axis of rotation of the roller 2 and the chassis 4. The resilient suspension members 30 in the preferred embodiment are of the type described in applicant's U.S. Patent No. 3,153,993, although it will be appreciated by those skilled in the art that other conventional forms of resilient suspension familarly used for earth rollers may be employed.

Referring to FIGURE 2, it will be seen that a vibrator shaft 40 concentric with the roller 2 is mounted concentrically therein for rotary motion independently of the roller by conventional radial thrust bearings 42, which prevent relative axial motion between the shaft 40 and the roller 2, positioned within the interior of the previously mentioned hollow hubs 24. The vibrator shaft 40 includes eccentrically weighted portions, (not shown) to exert periodically varying, vibratory forces upon the roller during rotation relative thereto in a well-known manner, and may be of the type described in the previously mentioned U.S. Patent No. 3,153,993.

A laterally extending driven shaft 46 positioned within the interior of the right box girder 12 is mounted in a bearing housing generally designated 44 for rotation about an axis aligned with the axis of rotation of the roller 2 in an undisturbed position thereof. Fixedly secured to the driven shaft 46 adjacent the right extremity thereof is a driven sheave 47. The sheave 47 is of conventional construction and includes a rim 48 provided with a plurality of peripherally extending channels 49 adapted to receive conventional, endless, flexible V-belts 50 (FIGURE 1). Similar channels are provided in the previously mentioned driving sheave 19 secured to the motor output shaft 16. An opening 54 extends through portions of the box girder 12 adjacent the left extremity of the driven shaft 46.

In a particularly significant aspect of the invention the driven shaft 46 is connected to the vibrator shaft 40 by a flexible, elongatable drive connection 55 to be described in more detail hereinafter. The flexible and elongatory properties of the drive connection 55 ensure that as the roller 2 undergoes periodic vibratory displacement or steering displacement skewing it relative to the chassis, with corresponding changes in the center-to-center distance between axis of rotation of the vibrator and the motor output shafts 40 and 16, such changes are isolated from the flexible drive belts 50 extending between the sheaves 19 and 47. In this manner, vibratory displacements of the roller 2 are prevented from causing corresponding periodic, vertical and longitudinal displacements of the belts 50, thus effectively eliminating the possibility that the drive belts 50 will become inverted in their sheave channels 49 or moved out of driving connection. In addition, flexural deformations of the belts 50 in response to the vibration of the roller 2 are minimized, thus enhancing belt life.

The flexible drive connection includes a slip shaft 55 having drivingly related, splined, telescopingly related, concentric first and second shafts 60 and 62. The first shaft 60 is drivingly connected to the vibrator shaft 40 by a universal joint 66 and the second shaft 62 is drivingly connected to the driven shaft 46 by a universal joint 68. In the preferred embodiment of the invention the flexible drive connection is of the type manufactured by Mechanics Universal Joint, of 2020 Harrison Ave., Rockford, Illinois, U.S.A., under the model designation No. 2A–11434–1 but it will be appreciated that any suitable drive connection which is both angularly and telescopically variable may be provided.

The telescoping connection afforded between the shafts 60 and 62 is particularly advantageous in compensating for relative axial motion between the adjacent ends of the vibrator and driven shafts, during both vibratory and steering motion of the roller.

Referring in more detail to the previously mentioned bearing housing 44 for the driven shaft 46, this includes a hollow, dome-shaped annular boss 80 concentric with the axis of rotation of the roller 2 in an undisturbed condition thereof. The boss 80 includes flange portions 81 abutting an inner wall 82 forming a portion of the previously mentioned girder 12, and is fixedly secured thereto by threaded connectors 83. Two axially spaced radial thrust bearings 84 and 85, fixedly secured to the interior of the boss 80, embrace the driven shaft 46 and support the driven shaft 46 for rotation about an axis aligned with the axis of rotation of the roller in the undisturbed position thereof, and prevent axial motion of the shaft 46 relative to the boss.

A portion of the driven shaft 46 extending outwardly to the right from the boss 80, is received within a central hub 86 of the previously mentioned sheave 47 and is prevented from rotating relative thereto by a key 88. A retaining washer 90 secured to the right end of the driven shaft 46 by a threaded connector 92 abuts portions of the hub 86 of the sheave 47 to retain the latter on the driven shaft. An aperture 94 provided in a right wall 96 of the girder 12 provides access to the connector 92. It will be appreciated that by enclosing both the driving and driven sheaves 19 and 47 within the totally enclosed interior of the box girder 12, significant protection from atmospheric and other deleterious influences is afforded to the flexible belts and, in addition, possible hazards to personnel sometimes associated with the use of belt-driven machinery are effectively minimized.

Considering the suspension for the roller 2 in more detail, each of the hubs 24 is provided with an axially extending, outwardly facing, peripheral bearing portion 100 of uniform radius. Each hub 24 further includes a radially extending shoulder 102 extending radially outwardly from an inner extremity of the bearing portion 100. The other extremity of the bearing portion 100 intersects a radially outwardy extending shoulder 103 of one of two similar annular flanges 104 each secured to the forward extremity of each of the hubs 24 by threaded connectors 106. The bearing portion 100 and the shoulders 102 and 103 define a peripherally extending bearing channel 107 extending about each respective hub 24 concentric with the axis of the roller 2. Received within the channel 107 and spaced from the adjacent surfaces 100, 102 and 103, is an annular portion 110 of generally rectangular axial cross-section forming a portion of an annular collar 112 fixedly secured to the previously mentioned supporting beam 28 by threaded connectors 114. A low friction bearing member 116 and 117 are interposed between the member 110 of the collar 112 and the surfaces 102, 100 and 103.

In order to exclude dirt from the bearing surfaces and retain lubrication, annular resilient oil seals 118 and 120 are provided. The oil seals 118 and 120 are positioned within annular, axially, inwardly directed projections 122 and 124 on the flange 104 and collar 112 respectively, which support the seals in abutting, sliding contact with adjacent portions of the collar 112 and the hub 24 respectively.

It will be appreciated that in constructing a vibratory earth roller in accordance with the present invention, significant operational advantages are provided.

In particular, the flexible connection afforded between the driven shaft and the vibratory shaft ensures that relative motion therebetween caused by vibratory or steering displacements of the roll is isolated from the flexible belts connecting the driving and driven sheaves. Such an arrangement ensures that the belts remain in correct driving position on the sheaves and minimizes periodic flexural deformation of the belts which might reduce belt life.

Also significant is the provision of telescoping members in the flexible joint which advantageously compensates for changes in the relative distance between the driven and vibrator shafts during vibratory and steering displacement of the roller.

In addition, the location of the driving and driven sheaves within an entirely enclosed box girder ensures that the belts are afforded protection against atmospheric and other deleterious influences and, in addition, reduced the hazard to personnel associated with belt drives.

Although the invention is described with reference to one preferred embodiment, it will be apparent to those skilled in the art that additions, deletions and modifications, substitutions and other changes not specifically described and illustrated herein, may be made which fall within the purview of the appended claims.

What is claimed is:

1. In a vibratory earth roller of the type including a chassis, a roller, resilient suspension means rotatably mounting the roller in the chassis, the suspension means being resilient to permit limited relative movement between the chassis and the axis of rotation of the roller, vibrator means having a vibrator shaft concentric with the roller mounted therein for independent rotary motion, motor means resiliently mounted on the chassis having a rotary output shaft, driving the driven sheaves respectively connected with the output and vibrator shafts and endless flexible means drivingly connecting the driving and driven sheaves; the improvement comprising:
   a driven shaft rotatably mounted on said chassis in fixed spaced relation from said output shaft, said driven shaft being fixedly connected within said driven sheave, and
   flexible drive means flexibly and drivingly connecting said driven shaft to said vibrator shaft,
   whereby notions of said roller induced by said vibratory means and terrain engagement are isolated from said flexible belt means.

2. The improvement defined in claim 1 wherein said flexible drive means includes:
   an intermediate shaft,
   a first universal joint connecting one end of said intermediate shaft to said driven shaft, and
   a second universal joint connecting the other end of said intermediate shaft to said vibratory shaft.

3. The improvement defined in claim 2 wherein said intermediate shaft includes:
   axially telescoping portions having inter-engaging portions for preventing rotation between said telescoping portions.

4. A vibratory earth roller comprising:
   a chassis,
   a roller,
   resilient suspension means rotatably mounting said roller in said chassis, said suspension means being resilient to permit limited movement between said chassis and the axis of rotation of said roller,
   vibrator means including,
      a vibrator shaft concentric with said roller mounted therein for independent rotary motion;
   motor means resiliently mounted to the chassis drivingly connected to
      an output shaft rotatably mounted on the chassis in fixed spaced relation thereto
   a driven shaft rotatably mounted on said chassis in fixed spaced relation from said output shaft,
   driving and driven sheaves respectively secured to said output shaft and said driven shaft,
   endless flexible belt means drivingly connecting said driving and driven sheaves, and
   flexible drive means flexibly and drivingly connecting said driven shaft to said vibrator shaft,
   whereby motions of said roller induced by said vibratory means and terrain engagement are isolated from said endless flexible belt means.

5. A vibratory earth roller as defined in claim 4 wherein said flexible drive means includes:
   an intermediate shaft,
   a first universal joint connecting one end of said intermediate shaft to said driven shaft, and
   a second universal joint connecting the other end of said intermediate shaft to said vibrator shaft.

6. A vibratory earth roller defined in claim 5 wherein said intermediate shaft includes:
   axially telescoping portions having inter-engaging portions for preventing relative rotation between said telescoping portions.

7. A vibratory earth roller as defined in claim 6 wherein said roller includes:
   a hub having a circular, outwardly facing, peripherally extending bearing surface concentric with the axis of rotation of said roller, said resilient suspension means including:
      a collar embracing said hub in relatively rotatable mating engagement with said bearing surface of said hub,
      a support member fixedly connected to said collar extending radially outwardly thereof, and
      resilient, load carrying members interposed between and connected with each of said support member and adjacent portions of said chassis.

8. A vibratory earth roller as defined in claim 7 wherein said chassis further includes,
   cover means entirely enclosing said sheaves and said flexible belt means.

References Cited

UNITED STATES PATENTS

| | | | |
|---|---|---|---|
| 2,248,478 | 7/1941 | Mall | 94—50 |
| 2,728,277 | 12/1955 | McRae | 94—48 |
| 2,812,696 | 17/1957 | Henry | 94—48 |
| 2,868,094 | 1/1959 | Andersson | 94—48 |
| 3,052,166 | 9/1962 | Thrun | 94—50 X |
| 3,108,519 | 10/1963 | Domenighetti | 94—50 |
| 3,153,993 | 10/1964 | Keppler | 94—50 |
| 3,225,669 | 12/1965 | Green | 94—50 |

NILE C. BYERS, JR., *Primary Examiner.*